United States Patent
Nguyen Thien et al.

(10) Patent No.: US 9,626,101 B2
(45) Date of Patent: Apr. 18, 2017

(54) INPUT DEVICE

(71) Applicant: CONTINENTAL AUTOMOTIVE GMBH, Hannover (DE)

(72) Inventors: Nhu Nguyen Thien, Regensburg (DE); Bernhard Schild, Wetzlar (DE)

(73) Assignee: Continental Automotive GmbH, Hannover (DE)

( * ) Notice: Subject to any disclaimer, the term of this patent is extended or adjusted under 35 U.S.C. 154(b) by 64 days.

(21) Appl. No.: 14/427,598

(22) PCT Filed: Sep. 9, 2013

(86) PCT No.: PCT/EP2013/068588
§ 371 (c)(1),
(2) Date: Mar. 11, 2015

(87) PCT Pub. No.: WO2014/040946
PCT Pub. Date: Mar. 20, 2014

(65) Prior Publication Data
US 2015/0242113 A1  Aug. 27, 2015

(30) Foreign Application Priority Data
Sep. 12, 2012 (DE) .................. 10 2012 216 195

(51) Int. Cl.
*G06F 3/041* (2006.01)
*G06F 3/045* (2006.01)
(Continued)

(52) U.S. Cl.
CPC .......... *G06F 3/04883* (2013.01); *G06F 3/016* (2013.01); *G06F 3/042* (2013.01);
(Continued)

(58) Field of Classification Search
CPC ...... G06F 3/0416; G06F 3/0488; G06F 3/044; G06F 3/04886
See application file for complete search history.

(56) References Cited

U.S. PATENT DOCUMENTS 7,450,108 B2    11/2008  Clabunde et al.
2005/0052406 A1  3/2005  Stephanick et al.
(Continued)

FOREIGN PATENT DOCUMENTS

DE    10120691    11/2002
DE    10341016     3/2005
(Continued)

*Primary Examiner* — Alexander Eisen
*Assistant Examiner* — Nan-Ying Yang
(74) *Attorney, Agent, or Firm* — Cozen O'Connor

(57) ABSTRACT

In an input device for inputting characters on a user interface by handwriting, the movement of an input unit, in particular a finger of a user, is detected and converted to an input pattern corresponding to the detected movement. The input pattern is compared with stored characters of a character set, and if the input pattern sufficiently matches one of the stored characters, the character is selected. During the input, the user receives acoustic feedback about the input process, such that the acoustic feedback signal is output in a constant manner outside a defined edge area of the user interface and is output in an incremental or continuous manner at a decreasing distance from the edge in a defined edge area of the user interface.

16 Claims, 2 Drawing Sheets

(51) Int. Cl.
*G06F 3/02* (2006.01)
*G09G 5/00* (2006.01)
*G06F 3/033* (2013.01)
*G06F 3/0488* (2013.01)
*G06F 3/01* (2006.01)
*G06F 3/042* (2006.01)
*G06F 3/044* (2006.01)
*G06F 3/16* (2006.01)

(52) U.S. Cl.
CPC .............. *G06F 3/044* (2013.01); *G06F 3/167* (2013.01); *B60K 2350/1004* (2013.01)

(56) References Cited

U.S. PATENT DOCUMENTS

| | | |
|---|---|---|
| 2005/0212755 A1 | 9/2005 | Marvit |
| 2005/0275638 A1* | 12/2005 | Kolmykov-Zotov G06F 3/04883 345/179 |
| 2007/0177801 A1* | 8/2007 | Kawamoto ............. A63F 13/10 382/187 |
| 2009/0295758 A1 | 12/2009 | Lee et al. |
| 2009/0305208 A1 | 12/2009 | Stewart et al. |
| 2010/0277411 A1 | 11/2010 | Yee et al. |
| 2011/0291954 A1* | 12/2011 | Djavaherian ........... G06F 3/016 345/173 |
| 2012/0032899 A1* | 2/2012 | Waeller ............... G01C 21/3664 345/173 |
| 2012/0302167 A1* | 11/2012 | Yun ..................... G06F 3/04883 455/41.2 |
| 2013/0050131 A1* | 2/2013 | Lee .................... G08G 1/09626 345/174 |

FOREIGN PATENT DOCUMENTS

| | | |
|---|---|---|
| DE | 10 2007 039450 | 2/2009 |
| JP | 59-117625 | 7/1984 |
| WO | WO 03/027822 A2 | 4/2003 |
| WO | WO 2009/040322 A1 | 4/2009 |

* cited by examiner

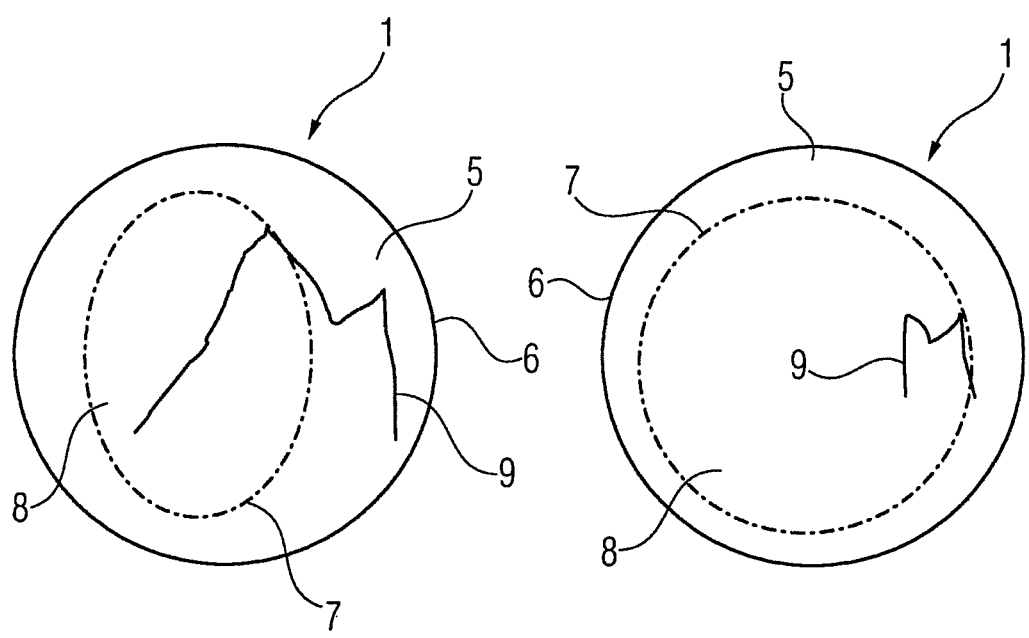

INPUT DEVICE

CROSS-REFERENCE TO RELATED APPLICATIONS

This is a U.S. national stage of application No. PCT/EP2013/068588, filed on 9 Sep. 2013, which claims priority to the German Application No. DE 10 2012 216 195.3 filed 12 Sep. 2012, the content of both incorporated herein by reference.

BACKGROUND OF THE INVENTION

1. Field of the Invention

The invention relates to an input device and a method for handwritten input of characters on a user interface.

2. Related Art

Known input devices for handwritten input of characters comprise, for example, touchpads and touchscreens as the user interface. These known input devices detect the movement of an input pen or a user finger on the user interface, and convert the detected movement into an input pattern. The input pattern is compared with a stored character set, and if there is a sufficient match between the input pattern and one of the characters in the character set, this character is selected. WO 2009/040322 A1 discloses the principle of such input devices and the use thereof in motor vehicles.

When the input device is used for handwritten input of characters onto a user interface in a motor vehicle, the user interface is normally not in the primary field of view of the driver and must therefore mostly be operated "blind". Input problems can arise here if the driver comes up against the edge of the user interface with the input pen or his finger when writing a character even though the input of the character is not yet complete. This problem is primarily caused by the fact that the driver does not have appropriate feedback about the position of the input pen or finger on the user interface because he is normally looking not at the user interface but at the road activity.

WO 03/027822 A2 discloses a further input device for handwritten input of characters onto a user interface.

This operating device generates and outputs, while a character is being input, an acoustic signal that is dependent on the input pen used.

SUMMARY OF THE INVENTION

An object of the invention is to develop an input device for handwritten input of characters onto a user interface such that the disadvantages described above for "blind" operation, in particular in a motor vehicle, are avoided.

This object is achieved, in one aspect of the present invention, by an input device and a method.

Like the known input device for handwritten input of characters on a user interface, the input device initially comprises a suitable detector that detects a movement of an input unit, in particular of a finger of an operator. This movement detector may be, for example, an array of capacitive sensors of a touchpad or touchscreen. The detected movement of the input means is converted into an input pattern, which is compared with stored characters. This task is normally performed by a microprocessor, with the characters stored on a memory element connected to the microprocessor. The stored characters may be a complete alphanumeric character set. In addition, the character set can contain any further characters, which, when there is a sufficient match between the input pattern and one of the stored characters, are selected based on this character for operating a device. This task is also performed by the microprocessor by a suitable program. In order to give the driver feedback about the input of the character, an acoustic feedback signal is generated and output during the handwritten input. The acoustic feedback signal may be selected, for example, from a plurality of stored acoustic signals and output via a loudspeaker. By the output of this acoustic feedback signal, the operator, for example the driver of a motor vehicle, is already receiving feedback that the input process on the user interface is recognized. Then in addition, the user interface is divided into two regions, namely an edge region and an inner region of the user interface, which inner region is enclosed by the edge region. The user input is meant to be made preferably in this inner region of the user interface, although inputs into the edge region are also recognized as such and accepted. If the user is positioned in the inner region of the user interface during the input, then a first, for instance constant, acoustic feedback signal is output, which, for instance, may correspond to a writing sound when writing on paper or a board, which sound is generally known. A constant feedback signal is understood to mean here a feedback signal that does not depend on the exact position of the input unit in the inner region but, for example, may also be made periodically (e.g., "peep" . . . "peep" . . . "peep").

If, on the other hand, the user reaches the edge region during input of the character, a modified output of the acoustic feedback signal, i.e., a second feedback signal, is generated that is different from the first feedback signal. The operator thereby receives the feedback that he has reached the edge region of the user interface and only has a small space left for completing the character input. As the distance from the input unit to the edge of the user interface decreases, the output of the acoustic feedback can be modified incrementally or continuously. Hence the warning is output in an increasingly modified manner as the edge of the user interface continues to get closer. Using such an input device, an operator also receives good feedback about the position of the input unit when the user interface is not in the field of view of the operator.

The user interface can be in the form of a touch-sensitive user interface. Touchscreens and touchpads, which are generally known in principle, can be used in this case.

The user interface may also be a virtual user interface in a defined operating space, and the detector that detects the movement of the input unit can contain an optical sensor, in particular a camera. In this case, for example, a specific region of a dashboard in the vehicle can be the user interface, which region does not need to comprise any sensors. The movement of the input unit is detected in this case via an optical sensor, which is directed onto the user interface and detects the movement. This optical sensor, which in particular can be in the form of a camera, can be arranged in a roof module of the vehicle, for instance, and can also perform other tasks such as interior monitoring, for example.

In a development of this embodiment, the virtual user interface can also be any virtual region in the interior of the motor vehicle. In this case, the user writes the character effectively into the air, wherein the writing movement spans, for example, a virtual user interface in the defined three-dimensional operating space, and the movement or gesture of the user is detected by a camera and processed in an otherwise known manner. Again, however, this form is not limited to use in motor vehicles but can also be used in any spaces.

The incremental or continuous modification of the acoustic feedback signal can be in the form of a frequency change, for example. For instance, if the frequency of the feedback signal increases, starting from reaching the edge region then continuing up to the edge of the user interface, the user thereby receives clearly identifiable feedback about getting closer to the edge of the user interface.

The incremental or continuous modification of the acoustic feedback signal can also be in the form of a change in amplitude, in particular also in the form of amplitude modulation. The user receives, also by such a change in the volume, a clear indication that he is approaching the edge of the user interface.

The defined edge region can have an asymmetric design with respect to the center point of the user interface. When entering characters in Latin script, the character is input from left to right for instance. Thus, for example, the left-hand edge region of the user interface is of significantly less interest than the right-hand edge region and top and bottom edge regions during the input process, because after starting the input the left-hand edge region is only reached again in exceptional cases. If in this case the left-hand edge region is designed to be smaller than the right-hand edge region, the user thus receives a feedback at the start of the input if he is positioned in the left-hand edge region. During the subsequent course of character input, however, reaching the right-hand edge region is of greater importance, and therefore the right-hand edge region is designed to be larger, and the modified feedback signal is output on reaching the right-hand edge region during character input in order to signal to the operator that only a little space still remains for completing the character input.

In addition, the defined edge region can also be dynamically variable, i.e., it can be adapted to the writing behavior of the particular user. For instance, if a user always writes relatively large characters onto the user interface, the edge region can be chosen to be larger in order to indicate to the user in good time that he now has only a relatively small space left for completing the character input if the script size does not change. On the other hand, if another user normally writes the characters in rather small writing onto the user interface, then even if he starts the character input close to the edge of the user interface, sufficient space is still left to this user to complete the character input. Thus in this case, the defined edge region can be chosen to be relatively small.

The input device can be used particularly advantageously in a motor vehicle, in which the user interface has a relatively small design, namely smaller than 150 cm$^2$, in particular smaller than 50 cm$^2$, and in which the user interface is arranged within range of a driver but outside a primary field of view of the driver. In particular, the user interface can be arranged in the center panel of a motor vehicle. The embodiment according to the invention of the input device can still guarantee reliable input of characters for these relatively small user interfaces outside the primary field of view of the driver. The defined edge region of the user interface can cover an area of 10 to 50% of the user interface. For a smaller proportion of less than 10%, the desired effect might no longer be fully achieved. For a proportion of more than 50%, on the other hand, the operator might feel during the input increasingly distracted by the modified signal and no longer interpret the modified feedback signal as a closer proximity to the edge region.

BRIEF DESCRIPTION OF THE DRAWINGS

The invention is described in greater detail below with reference to an exemplary embodiment and the drawings, in which:

FIGS. 2A-2D: show a user interface having four different embodiments of the edge regions.

DETAILED DESCRIPTION OF THE PRESENTLY PREFERRED EMBODIMENTS

Figure 1:
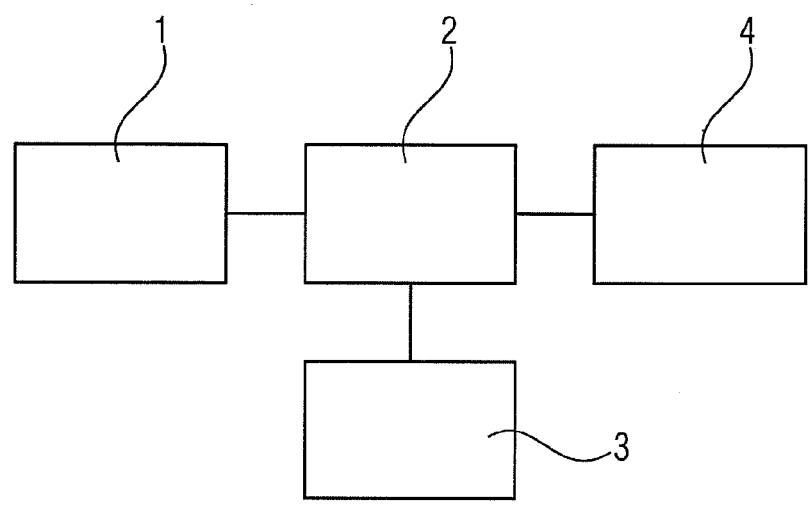
FIG. 1: is a block diagram of the input device.

FIG. 1 shows the block diagram of an input device according to the invention and the interaction of the input device with a device to be operated. The input device comprises a user interface 1. The user interface 1 may be in the form of a touchpad or touchscreen, for example, that uses capacitive or other manner of detection of a movement of an input unit. In particular, especially when the input device is used in a motor vehicle, the input unit can be a finger of an operator. A processing and analysis unit 2 uses a suitable program to convert the signals from the user interface into a movement pattern. The processing and analysis unit 2 is itself connected to a memory unit 3, on which patterns of a multiplicity of characters are stored. The processing and analysis unit 2 compares the input pattern with the stored characters, and when there is a sufficient match between the input pattern and one of the stored characters, selects this character as a recognized character. This pattern comparison can take place back while input is in progress, so that characters that have not yet been input completely can, even at this stage, be assigned unequivocally to a stored character. If this is the case, then in particular even before completing the character input, feedback that the character has already been recognized can be output to the operator, which feedback in particular is acoustic feedback that differs from the other acoustic feedbacks. The same applies to a character sequence. This can shorten the operating procedure. The processing and analysis unit 2 is additionally connected to a device 4 to be operated. The device 4 to be operated may be a multimedia device, for example. The device 4 comprises a loudspeaker (not shown).

It is known from the signals transmitted by the user interface 1 to the processing and analysis unit 2, in which region of the user interface 1 the finger of the user or the input unit is currently positioned. If the finger is positioned in an inner region of the user interface, then the processing and analysis unit 2 generates an acoustic feedback signal, which is output by the loudspeaker of the device 4. If the finger of the user enters a predefined edge region of the user interface 1, then this is also detected by the processing and analysis unit 2 from the signals transmitted by the user interface 1. In this case, the acoustic feedback signal is modified in order to indicate to the user that the edge region has been reached. As the distance from the finger to the edge of the user interface 1 decreases, acoustic feedback via the loudspeaker of the device 4 is increasingly modified. The user thereby constantly receives feedback about the position of a finger or of an input unit on the user interface 1. In particular, the edge region being reached, or the position in the edge region, is signaled to the user, thereby indicating to him that only a certain input region is still left to him for completing the character input. This can avoid the situation in which characters cannot be input completely because the edge of the user interface has been reached.

The invention is described further with reference to FIGS. 2A to 2D, which show user interfaces having a different embodiment of the edge region.

Figure 2A:
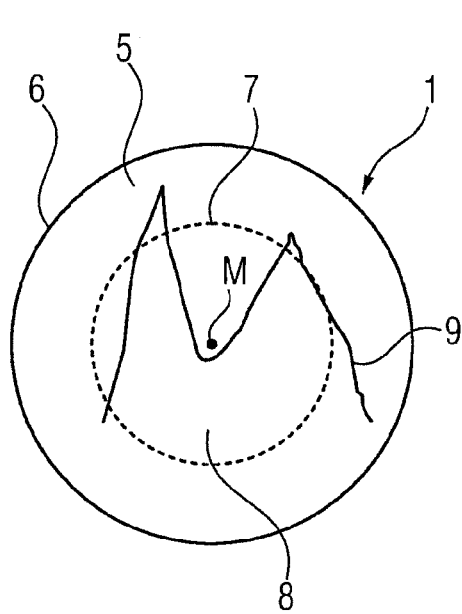

FIG. 2A shows an embodiment of the user interface 1 having an edge region 5, which is bounded by the edge 6 of the user interface 1 and by a virtual line 7. The virtual line 7 separates the edge region 5 from the inner region 8.

Although the virtual line 7 is shown here only to illustrate the invention, it can also be depicted in a real user interface. While the user is using his finger to input a character in the inner region 8 of the user interface 1, constant acoustic feedback is made, which signals to the user that he is positioned in the input region and his input is recognized. On passing over the virtual line 7 and crossing into the edge region 5, the acoustic feedback signal is modified in terms of tone, pitch frequency and/or tone modulation or the like, so that the operator receives appropriate acoustic feedback about leaving the inner input region 8. The operator hence recognizes that he may need to adapt his manner of character input in order to be able to input the character still completely within the user interface 1.

In the exemplary embodiment shown in FIG. 2A, the virtual line 7 is implemented symmetrically with respect to a center point M. The character 9 input by handwriting extends into the edge region 5 at a plurality of points, and therefore during input of these portions, the appropriate (modified) acoustic feedback signal is output.

When Latin characters are being input, they are always input from left to right. Thus during the character input, it is unlikely that the user will advance into the left-hand edge region (with respect to the input direction). The left-hand edge region, however, is therefore useful for also indicating to the user at the start of the character input whether he is positioned in this edge region or in an inner region. For the reason stated, however, the left-hand edge region can be designed to be smaller than a right-hand edge region or a top and a bottom edge region, into which the operator may enter with a finger during the character input.

Figure 2B:
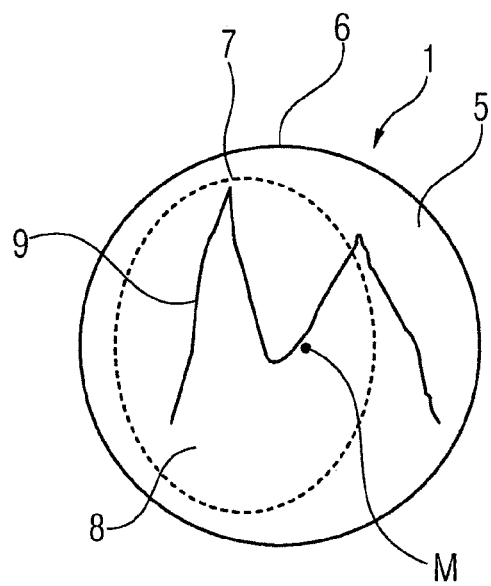

FIG. 2B shows an embodiment in which the edge region 5 has an asymmetric design with respect to the center point M of the user interface 1. In this embodiment, the operator receives early indication of the edge region 5 being reached while the inner region 8 still remains sufficiently large because of the asymmetric design of the edge region 5.

The definition of the edge region 5 can also be adapted dynamically to the input manner of the particular user. In this case, the analysis of the size of the input character from a plurality of character inputs is used to determine whether the particular user inputs the character in a rather large manner, i.e., using most of the user interface 1, or in a rather small manner, i.e., only within a smaller portion of the user interface 1. If an operator tends to input a character in a large manner, and if this has been recognized accordingly, then the edge region can be chosen to be larger in order to indicate to the operator in good time that he is approaching the edge 6 of the user interface 1 and runs the risk of not being able to input the character completely. The operator can thereupon modify his input manner in order to be able to input the character still completely on the user interface.

This is illustrated in FIG. 2C by a relatively large edge region 5 when a relatively large character 9 is being input.

The opposite case is shown in FIG. 2D, in which a user inputs a character 9 in relatively small writing. In this case, a smaller edge region 5 is sufficient, because for small input of the character this is sufficient to give the operator the appropriate indication of the edge region being reached and to complete the character input.

The invention can be used advantageously in motor vehicles in which, although the user interface is arranged within range of the driver, it is outside a primary field of view. The primary field of view of the driver is oriented in a straight line onto the road. If the user interface is arranged in a center console then it lies outside this primary field of view. The feedback about the input of a character is then made by the input device according to the invention without the driver having to leave his primary field of view.

In motor vehicles, the space for accommodating the various controls and hence also the space for the user interface is limited. The invention can be used advantageously precisely where the size of the user interface is limited in order to give the operator the required feedback. Such user interfaces in motor vehicles are often smaller than 150 $cm^2$, when arranged in a center console often even smaller than 50 $cm^2$. Thus leaving the user interface can happen unintentionally if appropriate feedback is not given.

The input device according to the invention increases the operating safety of motor vehicles during handwritten input of characters by it not being necessary for the driver to look away from his primary field of view towards the user interface in order to input the character correctly.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. An input device for handwritten input of characters on a user interface, comprising:
   a detector configured to detect a movement of an input unit;
   a converter configured to convert the detected movement into an input pattern;
   a comparison unit configured to compare the input pattern with stored characters;
   a selecting unit configured to select one of the stored characters on the basis of the comparison of the comparison unit; and
   a generating and outputting unit configured to generate and convert an acoustic feedback signal during the handwritten input,
   wherein outside a defined edge region of the user interface, the acoustic feedback signal is output as a first, and constant, acoustic feedback signal, and in a defined edge region of the user interface, the acoustic output signal is output as a second acoustic feedback signal that is modified incrementally or continuously as the distance to an edge of the user interface decreases, the second acoustic feedback signal being different from the first feedback signal, and
   wherein the defined edge region is dynamically variable so as to adapt a size of the defined edge region to writing behavior of a particular user of the user interface.

2. The input device as claimed in claim 1, wherein the user interface is a touch-sensitive user interface.

3. The input device as claimed in claim 1, wherein the user interface is a virtual user interface, in particular in a defined three-dimensional operating space, and the detector has an optical sensor.

4. The input device as claimed in claim 1, wherein the incremental or continuous modification of the acoustic feedback signal comprises a frequency change.

5. The input device as claimed in claim 1, wherein the incremental or continuous modification of the acoustic feedback signal is a change in amplitude using amplitude modulation.

6. The input device as claimed in claim 1, wherein the defined edge region has an asymmetric design with respect to a center point of the user interface.

7. The input device as claimed in claim 1, wherein the input device is used in a motor vehicle, the user interface is smaller than 150 cm$^2$, and is arranged within range of a driver of the motor vehicle but outside a primary field of view of the driver.

8. The input device as claimed in claim 7, wherein the defined edge region covers an area of 10% to 50% of the user interface.

9. A method for handwritten input of characters on a user interface, comprising:
   detecting movement of an input unit on the user interface;
   converting the detected movement into an input pattern;
   comparing the input pattern with stored characters;
   selecting one of the stored characters on the basis of a comparison of the detected input pattern with the stored characters; and
   generating an acoustic feedback signal during the handwritten input,
   wherein outside a defined edge region of the user interface, a first, and constant, acoustic feedback signal is output, and in a defined edge region of the user interface a second acoustic feedback signal is output as an acoustic feedback signal that is modified incrementally or continuously by a frequency change or a change in amplitude or a modified amplitude modulation as the distance to an edge of the user interface decreases, the second acoustic feedback signal being different from the first feedback signal, and
   wherein the defined edge region is dynamically variable so as to adapt a size of the defined edge region to writing behavior of a particular user of the user interface.

10. The method as claimed in claim 9, further comprising outputting a third acoustic feedback signal, different from the first and the second acoustic feedback signals, if a character or a character sequence can be assigned to a stored character or a stored character sequence even before the input is complete.

11. The input device as claimed in claim 1, wherein the input unit is a finger of an operator.

12. The input device as claimed in claim 3, wherein the optical sensor is a camera.

13. The input device as claimed in claim 7, wherein the user interface is smaller than 50 cm$^2$.

14. The method as claimed in claim 9, wherein the input unit is a finger of an operator.

15. The input device as claimed in claim 1, wherein the defined edge region is dynamically variable based at least in part on the characters being input.

16. The method as claimed in claim 9, wherein the defined edge region is dynamically variable based at least in part on the characters being input.

\* \* \* \* \*